United States Patent [19]

Hwang

[11] Patent Number: 5,043,070

[45] Date of Patent: Aug. 27, 1991

[54] MAGNETIC SOLVENT EXTRACTION

[75] Inventor: Jiann-Yang Hwang, Houghton, Mich.

[73] Assignee: Board of Control of Michigan Technological University, Houghton, Mich.

[21] Appl. No.: 434,896

[22] Filed: Nov. 13, 1989

[51] Int. Cl.$^5$ .................. B01D 11/04; C02F 1/26; C02F 1/48

[52] U.S. Cl. .................. 210/634; 210/222; 210/511; 210/695; 252/62.51; 252/62.56; 427/127

[58] Field of Search .............. 210/222, 511, 634, 695; 209/5, 8, 214, 232; 252/62.51, 62.52, 62.53, 62.54, 62.56; 427/127; 428/403, 692, 900

[56] References Cited

U.S. PATENT DOCUMENTS

| | | | |
|---|---|---|---|
| 3,483,969 | 12/1969 | Rosensweig | 210/695 |
| 3,796,660 | 3/1974 | Kaiser | 210/695 |
| 3,806,449 | 4/1974 | Kaiser | 210/695 |
| 3,923,651 | 12/1975 | Weiss et al. | 210/695 |
| 3,926,789 | 12/1975 | Shubert | 209/8 |
| 4,108,767 | 8/1978 | Cooper | 210/695 |
| 4,356,098 | 10/1982 | Chagnon | 252/62.51 |
| 4,596,283 | 6/1986 | Ciprios et al. | 210/695 |
| 4,624,797 | 11/1986 | Wakayama et al. | 252/62.51 |
| 4,695,392 | 9/1987 | Whitehead et al. | 252/62.54 |
| 4,741,850 | 5/1988 | Wyman | 210/695 |
| 4,834,898 | 5/1989 | Hwang | 252/62.56 |
| 4,906,382 | 3/1990 | Hwang | 209/214 |

OTHER PUBLICATIONS

J. Y. Hwang, et al., Society of Mining Engineers of AIME preprint No. 85-11, presentation at SME-AIME Annual Meeting, Feb. 24-28, 1985.

P. Parsonage, "Selective Magnetic Coating for Mineral Separation", Trans. Instn. Min. Metall, 93, Mar. 1984.

*Primary Examiner*—W. Gary Jones

*Attorney, Agent, or Firm*—Michael, Best & Friedrich

[57] ABSTRACT

Particles of a magnetic material coated with a hydrophobic surfactant are dispersed in an organic solvent extractant to produce a magnetic solvent extractant which can be used in solvent extraction processes. Phase separation of an organic phase, carrying the component to be separated, from the aqueous phase can be accelerated by applying a magnetic field to the organic phase. After removal of the organic phase, a magnetic field can be applied to the aqueous phase to remove any residual organic phase and thereby enhance the degree of separation.

15 Claims, No Drawings

MAGNETIC SOLVENT EXTRACTION

BACKGROUND OF THE INVENTION

This invention relates to solvent extraction of one or more components from an aqueous solution or mixture.

Solvent extraction is a well-established technology for selectively removing or extracting one or more components from a solution. It can be used to remove a valuable component from contaminants or remove contaminants from a valuable component. For example, it can be used to separate a metal ion or a metal ion complex from an aqueous solution. A suitable immiscible liquid organic solvent extractant, which usually includes a diluent such as kerosene and/or fuel oil, is mixed with the solution and the metal ion or metal ion complex is dissolved, or pulled into the organic solvent extractant by a chemical bonding, to form an immiscible organic phase. The resulting emulsion or dispersion is transferred to a settler in which a lack of agitation promotes gravity settling for disengaging the organic and aqueous phases. The "loaded" organic phase containing the extracted metal ion or metal ion complex is transferred to a stripper where the extracted metal or metal ion complex is stripped from the organic phase and the organic solvent extractant is recycled for another extraction.

In conventional solvent extraction processes, separation of the organic phase after mixing is slow and does not always yield a clean separation. That is, some of the organic phase, which can be in the form of small droplets, remains in the aqueous phase even after long settling periods. Centrifuging to accelerate and enhance the degree separation is not practical for industrial operations.

Many techniques have been used to magnetize nonmagnetic materials to permit these to be selectively separated from a mixture by magnetic separation.

For example, U.S. Pat. No. 3,926,789 (Shubert) discloses selectively coating the surface of one or more components in a mixture with a magnetic fluid consisting of a suspension of magnetic particles in a liquid carrier and then subjecting the mixture to a magnetic separation.

J. Y. Hwang, et al., *Society of Mining Engineers of AIME* preprint No. 85-11, presentation at SME-AIME Annual Meeting Feb. 24-28, 1985 discloses a separation process including the steps of admixing a flocculant and particles of magnetite with a slurry containing finely-ground alunite ore to co-flocculate the magnetite and quartz liberated from the ore and separating the co-flocculant from the alunite in a high gradient separator.

P. Parsonage, "Selective Magnetic Coating for Mineral Separation", *Trans. Instn. Min. Metall,* 93, March 1984, discloses selectively coating mineral and metallic particles with colloidal magnetite and then separating thus-coated particles with a magnetic separator.

U.S. Pat. No. 4,834,898 (Hwang) discloses a reagent for magnetizing particles of a nonmagnetic material consisting of particles of a magnetic material, such as magnetite, coated with two layers of surfactants and dispersed in water.

None of these references discloses, and applicant is unaware of any other prior art which, discloses magnetizing an organic solvent extractant so that the separation of an organic phase, containing the extractant and one or more extracted components, from an aqueous mixture can be enhanced by magnetic separation.

SUMMARY OF THE INVENTION

An object of the invention is to provide a solvent extraction method in which the separation of the organic phase from the aqueous phase is accelerated and the degree of separation can be improved.

Another object of the invention is to provide a magnetized organic solvent extractant which can be used for solvent extraction and renders the organic phase magnetic.

A further object of the invention is to provide an additive for magnetizing an organic solvent extractant.

Other objects, aspects and advantages of the invention will become apparent to those skilled in the art upon reviewing the following detailed description and the appended claims.

The invention provides an additive for magnetizing an organic solvent extractant comprising particles of a magnetic material coated with a surfactant which renders the particles sufficiently hydrophobic to be readily dispersed in the extractant.

The invention also provides a magnetic organic solvent extractant comprising an organic solvent extractant containing a sufficient amount of the above additive to render the extractant magnetic.

The invention further provides a method for solvent extracting from an aqueous phase an organic phase containing the component to be separated, which method includes the steps of mixing a magnetic organic solvent extractant described in the immediately preceding paragraph with an aqueous solution or mixture to initiate separation and then subjecting the organic phase to a magnetic field to accelerate separation. After the organic phase has been removed, the aqueous phase can be subjected to a magnetic field to separate residual organic phase and thereby improve the degree of separation.

DESCRIPTION OF THE PREFERRED EMBODIMENTS

The organic solvent extractant can be any liquid, immiscible, organic solvent extractant having the capability of selectively dissolving, or otherwise pulling by chemical bonding, the component to be separated from the aqueous phase. The particular organic solvent extractant used for a specific separation is not part of the invention and depends primarily upon the physical and chemical properties of the component to be separated and the aqueous phase. Well-established criteria can be followed to select the appropriate organic solvent extractant and the amount to use. For example, technical literature published by Henkel Corporation provides information regarding the use of a number of commercially available organic solvent extractants.

The organic solvent extractant can include a suitable diluent, such as kerosene and/or fuel oil. As used herein, the term "organic solvent extractant" means either an organic solvent suitable for use in a solvent extraction and a mixture of such a solvent and a suitable diluent.

Commercially available organic solvent extractants suitable for use in separating a metal ion from an aqueous phase include 2-hydroxy-5-nonylbenzo-phenoneoxime, 5,8-diethyl-7-hydroxydodecan-6-oxime, 5-dodecyl-salicylaldoxime, 8-hydroxyquinoline, tri-n-octylamine, tri-($C_{8-10}$)amine, tri-isodecylamine, trilaurylamine, tri- (C$_{8-10}$) methylammonium chloride, tri-n-octylophosphine oxide, and di-2-ethylhexylphosphoric acid.

In accordance with the invention, organic solvent extractants are rendered magnetic by mixing a particulate magnetic material therewith. As used herein, the term "magnetic material" means a material having ferromagnetic or strong paramagnetic properties. Suitable magnetic materials include magnetite, ferrites, hematite, maghemite, pyrrhotite and metals, alloys and compounds containing iron, nickel or cobalt. Magnetite is preferred because of its lower cost. The magnetic material may be derived from various sources. For example, magnetite may be obtained from ores and prepared by grinding or by the so-called wet method. Colloidal magnetite can be precipitated by reacting solutions of ferrous and ferric salts with alkali metals in accordance with the procedure described by W. C. Elmore, *Physical Review*, Series II, Vol. 54, p. 309 (1938). The size of magnetite and ferrite produced by the wet method usually ranges from about 70 angstroms up to 10 or more micrometers.

The particle size of the magnetic material is not particularly critical. Generally, the particle size can range from about 30 angstroms up to 10 micrometers or even higher. Coarser materials have a greater tendency to agglomerate. Such agglomerates can be broken down by a demagnetizing treatment or an ultrasonic dismemberation.

Particles of the magnetic material, particularly magnetite, will not readily disperse in an organic solvent extractant. This problem is overcome by rendering the surfaces of the particles of magnetic materials hydrophobic prior to mixing with an organic solvent extractant. This can be effected by coating the surfaces of the particles of magnetic material with a polar surfactant which adsorbs onto the particle surfaces and includes functional groups having anionic, cationic or amphoteric properties.

The surfactant can be a short chain type having a molecular weight as low as about 80 or a long chain type containing up to about 120 carbon atoms or more and having a molecular weight up to 20,000 or more. The specific surfactant used depends primarily upon the nature of the particles of magnetic material to be rendered hydrophobic.

Suitable anionic surfactants include carboxylates, such as caprilic acid, lauric acid, oleic acid and polyoxyethylene sorbitan monolaurate; xanthates, such as sodium isopropyl xanthate, sodium isobutyl xanthate, potassium amyl xanthate, potassium hexyl xanthate and potassium nonyl xanthate; dithiophosphates, such as sodium dialkyl dithiophosphate and aryl dithiophosphoric acid; phosphates, such a polyoxyethylene dinonyphenyl ether phosphate; hydroxamates, such as potassium hexyl hydroxamate and alkkyldimethyl ammonium hydroxamate; sulfonates, such as petroleum sulfonate and ammonium lignin sulfonate; sulfosuccinates, such as sodium dioctyl sulfonsuccinate; taurates, such as sodium-N-methyl-N "coconut oil acid"-taurate; and sulfates, such as sodium cetyl sulfate and sodium lauryl sulfate.

Suitable cationic surfactants include amines, such as bis(2-hydroxyethyl) soyamine, hydrogenated-tallowamine acetate, oleyl primary amine acetate, lauric amine, C$_{8-10}$ oxypropyl amine, N-alkyl-1, 3-propane diamines, alkyltrimethyl ammonium chlorides, dialkyldimethylammonium chlorides, dicocoamine, dimethyldodecylamine, 3-aminopropyltrimethoxysilane, primary isodecyl ether amine acetate, coco-amine acetate, tallow-amine acetate and rosin-amine acetate.

Suitable amphoteric surfactants include amino acids, such as N-coco-beta-aminobutyric acid.

While other suitable techniques can be used, the adsorption of the surfactant onto the surfaces of the particles of magnetic material can be conveniently carried out by mixing the particles and a surfactant in water. After the adsorption is completed, the hydrophobic, colloidal particles of magnetic material can be removed from the solution by magnetic means and excess surfactant removed therefrom by washing with water.

The hydrophobic, colloidal particles of magnetic material are readily dispersible in organic solvent extractants. A sufficient amount of these particles is mixed with the organic solvent extractant to magnetize the extractant. Generally, the amount of colloidal particles of magnetic material in the resulting magnetic organic solvent extractant is about 0.01 to about 40 weight %.

For solvent extraction, the magnetic organic solvent extractant can be used in the same manner as the starting organic solvent extractant, except that a magnetic field is applied to accelerate phase separation and improve the degree of separation. For example, the magnetic organic solvent extractant can be mixed with the aqueous mixture being treated and the resulting dispersion is transferred to a settling unit to effect separation of an organic phase "loaded" with the component to be separated from the aqueous phase. While in the settler, the dispersion is subjected to a magnetic field which accelerates phase separation because of the magnetic nature imparted to the organic phase by the magnetic organic solvent extractant. The degree of phase separation also is enhanced by the attraction of the organic phase to the magnetic force.

After phase separation, the aqueous phase preferably is subjected to a magnetic field to remove any residual organic phase and thereby further improve the degree of phase separation. The separated components can be stripped from the magnetic organic solvent extractant and the extractant recycled for re-use in the usual manner.

Without further elaboration, it is believed that one skilled in the art, using the foregoing description, can utilize the invention to its fullest extent. The following examples are presented to exemplify embodiment of the invention and should not be considered as limitations thereto.

EXAMPLE 1

2 g of magnetite particles having an average particle size of about 10 nanometers were mixed with 0.4 g of bis(2-hydroxyethyl) soyamine by stirring in 10 ml of water for 5 minutes. The solution was then decanted by immobilizing the magnetite particles with a magnet. Excess surfactant was removed from the magnetite particles by washing with 40 ml of water. Washing was carried out by stirring the magnetite particles in the water and decanting the water in a magnetic field. Hydrophobic, colloidal magnetic particles were thus prepared.

The hydrophobic, colloidal magnetic particles were mixed with 4 ml of a mixture of 2-hydroxy-5-nonylbenzo-phenoneoxime and 5, 8-diethyl-7-hydroxydodecan-6-oxime (LIX 64N marketed by Henkel Corporation) and 40 ml of kerosene.

It was observed under a microscope that the colloidal magnetic particles were completely dispersed in the organic phase. An organic solvent extractant was thus prepared.

EXAMPLE 2

Separate aliquots of hydrophobic colloidal magnetic particles prepared by the procedure described in Example 1 were mixed with LIX-54 (Henkel Corporation) tri-octylphosphine oxide, tri-($C_{8-10}$) methylaluminum chloride and tri-($C_{8-10}$) amine and kerosene in the same quantities described in Example 1. Magnetic organic solvent extractants were produced in all of these tests.

EXAMPLE 3

A mixture of 2 g of magnetite particles having an average particle size of about 10 nanometers and 10 ml of water were mixed with 0.8 g of sodium oleate at 60° C. for 15 minutes. 3 drops of 50% hydrochloric acid were added to this mixture. After immobilizing the magnetite particles with a magnet, the mixture was decanted and about 40 ml of water was added to wash the excess surfactant from the resulting hydrophobic, colloidal magnetite particles coated with oleic acid.

Separate aliquots of the hyrdrophobic, colloidal magnetic particles were mixed with kerosene and the solvent extractants described in Examples 1 and 2, using the same procedures and quantities described in Examples 1 and 2. Microscopic examination of all of the products revealed that the colloidal magnetic particles were dispersed throughout the resulting magnetic organic solvent extractant.

EXAMPLE 4

0.983 g of CuSO. $5H_2O$ were dissolved in 100 ml of water in a container. 2 drops of 5% $H_2SO_4$ were added to the resulting solution to change the pH to 2.5. This solution was analyzed and found to contain 2720 ppm Cu. Approximately 20 ml of the magnetic organic solvent extractant prepared in Example 1 was mixed with 20 ml of the copper solution by stirring for 5 minutes. A magnet was placed on top of the mixture to accelerate the buoyancy of the magnetic organic phase. After a total settling period of no longer than about 5 minutes, the aqueous phase was collected by draining from the bottom of the container. Residual droplets of the organic phase were removed from the aqueous phase by passing through a magnetic separator. The aqueous phase was analyzed and it was found that this treatment reduced the copper content therein from 2720 ppm to 273 ppm.

From these results, it can be seen that hydrophobic, colloidal magnetic particles capable of being readily dispersed in an organic solvent extractant can be prepared by mixing a suitable surfactant with a magnetic material, such as magnetite. It can also be seen that such particles can be used to magnetize an organic solvent extractant without affecting its ability to act as a extractant. It further can be seen that separation of an organic phase containing a magnetic organic solvent extractant of the invention from an aqueous phase can be accelerated and the degree of separation enhanced by subjecting the organic phase to a magnetic field and the degree of separation can be further improved by subsequently subjecting the aqueous phase to a magnetic field to remove residual organic phase therefrom.

From the foregoing description, one skilled in the art can easily ascertain the essential characteristics of the invention and, without departing from the spirit and scope thereof, make various changes and modifications to adapt it to various usages.

I claim:

1. A magnetic organic solvent extractant for use in liquid extracting metal ion from an aqueous phase comprising
   a liquid, water-immiscible, organic solvent extractant capable of selectively dissolving or otherwise pulling by chemical bonding the metal ion desired to be separated from the aqueous phase; and
   a sufficient amount of particles of a magnetic material to render said extractant magnetic dispersed in said extractant, the surfaces of said magnetic particles being coated with a surfactant which renders said particles sufficiently hydrophobic to be readily dispersed in said extractant.

2. A magnetic organic solvent extractant according to claim 1 wherein said surfactant has anionic, cationic or amphoteric properties.

3. A magnetic organic solvent extractant according to claim 2 wherein said magnetic particles are magnetite.

4. A magnetic organic solvent extractant according to claim 3 wherein said magnetic particles have an average size ranging from about 30 angstroms up to about 10 micrometers.

5. A magnetic organic solvent extractant according to claim 2 wherein said surfactant has anionic properties and is a carboxylate, xanthate, dithiophosphate, phosphate, hydroxamate, sulfonate, sulfonsuccinate, taurate or sulfate.

6. A magnetic organic solvent extractant according to claim 2 wherein said surfactant has cationic properties and is an amine.

7. A magnetic organic solvent extractant according to claim 2 wherein said surfactant has amphoteric properties and is an amino acid.

8. A method for solvent extracting a metal ion from an aqueous phase comprising the steps of
   admixing with a liquid, immiscible organic solvent extractant capable of selectively dissolving or otherwise pulling by chemical bonding said metal ion from the aqueous phase, a sufficient amount of magnetic particles to render said organic solvent extractant magnetic and produce a magnetic solvent extractant, said particles being coated with a surfactant which renders said magnetic particles sufficiently hydrophobic to be readily dispersed in said organic solvent extractant;
   admixing said magnetic organic solvent extractant with an aqueous-based mixture containing said metal ion to initiate separation of an organic phase containing said organic solvent extractant and said metal ion from the aqueous phase;
   subjecting said organic phase to a magnetic field to accelerate separation from the aqueous phase; and
   removing said organic phase from the aqueous phase.

9. A method according to claim 8 wherein the aqueous phase is subjected to a magnetic field after removal of the organic phase to remove residual amounts of the organic phase from the aqueous phase.

10. A method according to claim 9 wherein said surfactant has cationic properties and is an amine.

11. A method according to claim 8 wherein said surfactant has anionic, cationic, or amphoteric properties.

12. An additive according to claim 11 wherein said magnetic particles are magnetite.

13. A method according to claim 12 wherein said magnetite particles have an average size ranging from about 30 angstroms up to about 10 micrometers.

14. A method according to claim 11 wherein said surfactant has anionic properties and is a carboxylate, xanthate, dithiophosphate, phosphate, hydroxamate, sulfonate, sulfonsuccinate, taurate or sulfate.

15. A method according to claim 11 wherein said surfactant has amphoteric properties and is an amino acid.

* * * * *